United States Patent
Zortman et al.

(10) Patent No.: US 9,632,261 B1
(45) Date of Patent: Apr. 25, 2017

(54) DEVICE-PACKAGING METHOD AND APPARATUS FOR OPTOELECTRONIC CIRCUITS

(71) Applicant: Sandia Corporation, Albuquerque, NM (US)

(72) Inventors: William A. Zortman, Corrales, NM (US); Michael David Henry, Albuquerque, NM (US); Robert L. Jarecki, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 9 days.

(21) Appl. No.: 14/819,293

(22) Filed: Aug. 5, 2015

Related U.S. Application Data

(60) Provisional application No. 62/033,868, filed on Aug. 6, 2014.

(51) Int. Cl.
*G02B 6/42* (2006.01)
*G02B 6/122* (2006.01)

(52) U.S. Cl.
CPC .......... *G02B 6/423* (2013.01); *G02B 6/1225* (2013.01); *G02B 6/4251* (2013.01); *G02B 6/4268* (2013.01); *G02B 6/4278* (2013.01)

(58) Field of Classification Search
None
See application file for complete search history.

(56) References Cited

U.S. PATENT DOCUMENTS

| | | | | |
|---|---|---|---|---|
| 5,915,168 A | 6/1999 | Salatino et al. | | |
| 6,491,447 B2 * | 12/2002 | Aihara | ............. | G02B 6/4214 385/89 |
| 6,502,999 B1 * | 1/2003 | Cohen | ............. | G02B 6/4246 385/147 |
| 6,611,635 B1 * | 8/2003 | Yoshimura | ......... | G02B 6/12002 257/E23.01 |
| 7,373,033 B2 * | 5/2008 | Lu | ............. | G02B 6/421 257/432 |

(Continued)

OTHER PUBLICATIONS

Jones, A.M. et al., "Layer Separation Optimization in CMOS Compatible Multilayer Optical Networks", 2013 Optical Interconnects Conference, book ISBN : 978-1-4673-5061-7; book e-ISBN : 978-1-4673-5063-1 , 978-1-4673-5062-4 DOI 10.1109/OIC.2013.6552924.

(Continued)

*Primary Examiner* — Tina Wong
(74) *Attorney, Agent, or Firm* — Martin I. Finston

(57) ABSTRACT

An optoelectronic device package and a method for its fabrication are provided. The device package includes a lid die and an active die that is sealed or sealable to the lid die and in which one or more optical waveguides are integrally defined. The active die includes one or more active device regions, i.e. integral optoelectronic devices or etched cavities for placement of discrete optoelectronic devices. Optical waveguides terminate at active device regions so that they can be coupled to them. Slots are defined in peripheral parts of the active dies. At least some of the slots are aligned with the ends of integral optical waveguides so that optical fibers or optoelectronic devices inserted in the slots can optically couple to the waveguides.

15 Claims, 8 Drawing Sheets

(56) References Cited

U.S. PATENT DOCUMENTS

| | | | | |
|---|---|---|---|---|
| 7,547,151 | B2* | 6/2009 | Nagasaka | G02B 6/4214 385/53 |
| 7,668,414 | B2* | 2/2010 | Shemi | G02B 6/125 385/14 |
| 8,876,408 | B2* | 11/2014 | Wohlfeld | G02B 6/4214 385/88 |
| 2006/0177173 | A1* | 8/2006 | Shastri | G02B 6/42 385/14 |
| 2009/0154872 | A1* | 6/2009 | Sherrer | G02B 6/4248 385/14 |

OTHER PUBLICATIONS

Sherrer, D.W. et al., "Wafer-Level Packaging Technology for 10Gbps TOSAs", Electronic Components and Technology Conference, 2005. Proceedings. 55th, May 31, 2005-Jun. 3, 2005, DOI: 10.1109/ECTC.2005.1441440, IEEE.

* cited by examiner

DEVICE-PACKAGING METHOD AND APPARATUS FOR OPTOELECTRONIC CIRCUITS

CROSS-REFERENCE TO RELATED APPLICATION

This application claims priority to U.S. Provisional Patent Application No. 62/033,868, filed on Aug. 6, 2014 under the title, "DEVICE-PACKAGING METHOD AND APPARATUS FOR OPTOELECTRONIC CIRCUITS", the entirety of which is incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

FIELD OF THE INVENTION

This invention relates to packaging for electronic and photonic circuits and MEMS devices, and more particularly to chip-scale photonic device packages that include provisions for optical coupling to external circuits and devices.

ART BACKGROUND

The field of photonics is expanding rapidly. The abundance of emerging devices includes new multifunctional devices that, to be practical, will require photonic circuitry to be jointly packaged with electronic circuitry. For example, there will be a need to integrate electronic processing within a single package with high-bandwidth optical input-output (I/O) and radio frequency (RF) photonics.

Great advances have been made in the packaging of electronic circuitry. For the new generation of photonic and multifunctional devices to achieve market acceptance, it will be necessary for the packaging of hybrid, standalone, and monolithic optoelectronic circuits to keep pace with similar advancements.

For example, optical fiber coupling to device packages continues to pose a challenge. Conventional methods use vertically coupled or side-coupled optical fibers. Vertical coupling is band limited and can introduce excess power loss. Although side coupling does not generally suffer these disadvantages, there remains a need for a dependable way to maintain the side-coupled fibers in position for the full product lifetime.

SUMMARY OF THE INVENTION

We have developed an improved device package adapted for the side coupling of optical fibers and solid state lasers to the photonic circuitry, such as chip-scale circuitry, that is contained within the package.

We have also developed a new method of wafer-level packaging that encloses optical circuits in hermetic silicon packages and concurrently provides features for the auto-alignment of coupled optical fibers or diode lasers. The coupled lasers may be edge-emitting lasers or vertical-cavity surface-emitting lasers (VCSELs). One advantage of our new packaging approach is that in implementations, an exact match of optical modes can be made between the rectangular waveguide of an edge-emitting laser and the photonic chip waveguide, so that coupling can be made directly without the intermediation of an optical fiber.

Accordingly, an embodiment of the invention in a first aspect is an optoelectronic device package comprising an active die having upper and lower faces and at least one lid die sealable to a face of the active die. A plurality of optical waveguides are integrally defined in the active die. The active die also includes at least one active device region, by which is meant either an optoelectronic device or a defined space for the placement of an optoelectronic device. Accordingly, the active device region may include an optoelectronic device integrally defined in the active die or a discrete optoelectronic device that has been placed and mounted therein by flip-chip attachment or a similar technique. At least one of the optical waveguides terminates at such an active device region, so that an optoelectronic device situated at the active device region can be optically coupled to the waveguide for the purpose, e.g., of routing an optical signal within the device package.

Further, at least one slot is defined in the sidewall of the active die by removal of material to some depth. By "sidewall" is meant a peripheral border area of the die that is empty of active devices. At least one of the optical waveguides terminates at such a slot, so that an optical fiber or optoelectronic device inserted in the slot can optically couple to the waveguide for routing an optical signal into and/or out of the device package.

In various embodiments, at least one slot is conformed to accept an inserted optical fiber or optoelectronic device, has a rectangular cross section, or aligns with a corresponding channel defined in the lid die.

In embodiments, at least one groove for aligning an inserted optical fiber is formed in a face of the active die. The fiber-alignment groove is aligned with an slot and extends from the slot to an end of an optical waveguide or to an active device region. The fiber alignment groove may be a V-groove or it may have another cross-sectional shape such as a semicircle or rectangle.

In some embodiments, a locally thinned sidewall portion of the active die is coupled to at least one of the optical waveguides so that optical signals can be transmitted through the sidewall between the waveguide and an external optical path. In some embodiments, the locally thinned portion is similarly coupled to at least one active device region. In some embodiments, the locally thinned portion is in the device lid, so that optical coupling to a waveguide or to an active device region is enabled when the device package is assembled.

In some embodiments, a capacitive or inductive power coupler is connected to the active die. The active die or the lid die has a thinned but imperforate sidewall portion. The power coupler has an input side adjacent to the exterior face of the thinned portion and an output side adjacent to the interior face of the thinned portion.

In embodiments, the lid die is hermetically sealed to the active die.

In embodiments, at least one electrical or optical feedthrough penetrates the active die or the lid die. The feedthrough is respectively coupled to an electrical conductor pattern, or to a waveguide or active device region defined on the active die.

In some embodiments, the active die is a photonic chip having two or more layers of photonic interconnect. This can be provided, e.g., in a structure in which a lower silicon optical layer is overlain by an upper silicon nitride optical layer. Photonic interconnects from the several layers are optically coupled to external optical elements inserted in respective ones of the slots. The inserted external elements may be, for example, optical fibers or laser diodes. In another example, an external optical element is an optoelectronic device that has two or more input/output (I/O) ports. The optoelectronic device is fixed within an slot such that each of the ports is optically coupled to a photonic interconnect in a respective one of the interconnect layers.

In some embodiments, at least one channel for microfluidic coolant transport is defined in the active die and/or in one or two lid dies.

In embodiments, the active die is layered between a top lid die and a bottom lid die. In embodiments, multiple active dies are layered and bonded together using, e.g., through-silicon vias (TSVs) for the vertical interconnections.

DETAILED DESCRIPTION

Figure 1:
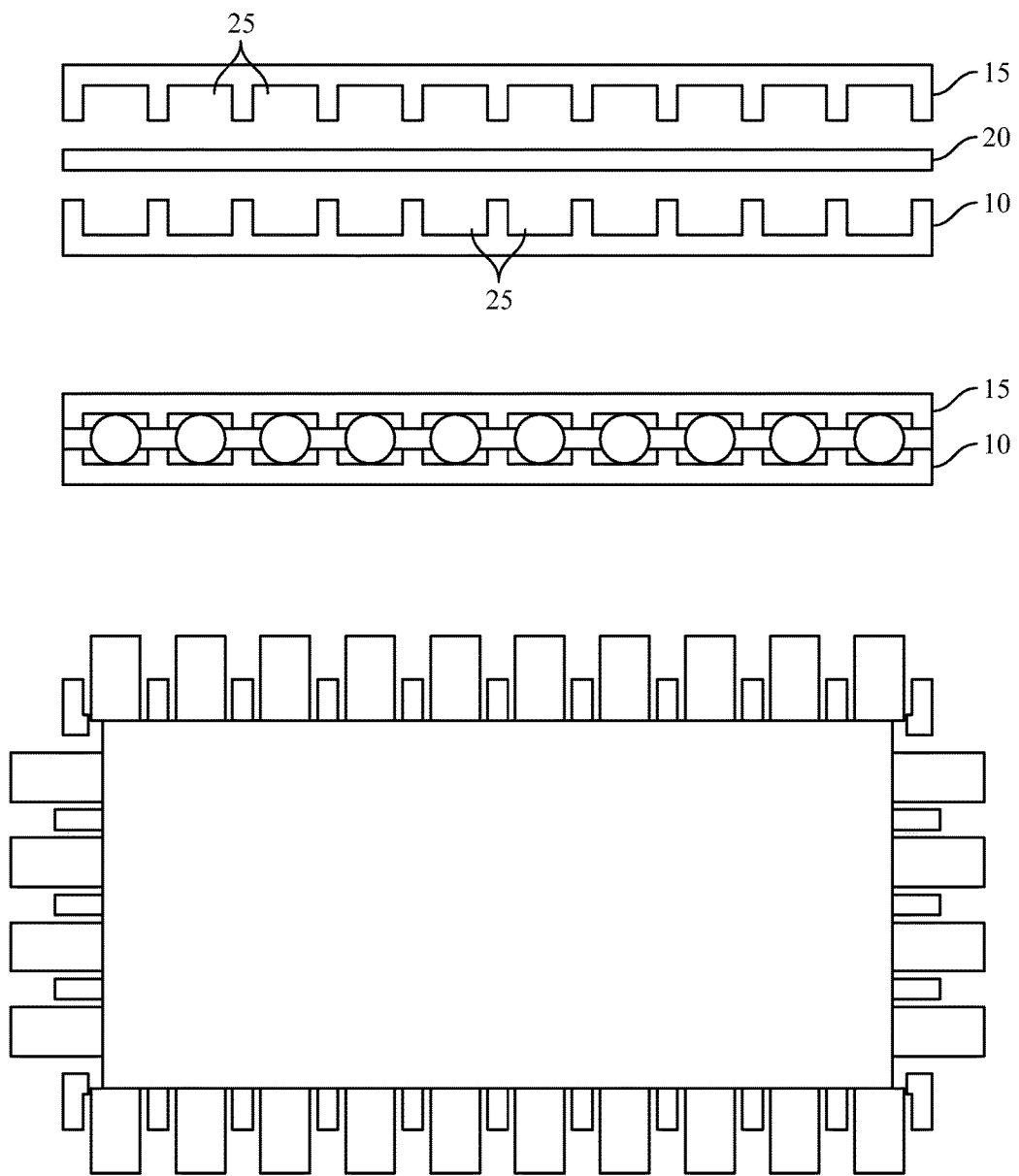
FIG. 1 provides a simplified view of a package for a silicon photonic chip or the like according to an embodiment of the present invention that is adapted for side-coupling of fiber optics to the chip. The first view (from top to bottom) is a side-elevational, exploded view of the package before bonding. The second view is a side-elevational view of the package after bonding. The third view is a top-side plan view of the package after bonding. Although the figure is directed specifically to a method of chip-level packaging, it may also be taken, with minor adjustments, as a representative detail of a figure depicting wafer-level packaging according to another embodiment of the invention.

An exemplary embodiment of the invention as shown in FIG. 1 is a package for encasing a silicon photonic circuit, a silicon photonic-electronic circuit, a multifunctional device having optical inputs and/or outputs, or the like. As seen in the figure, the package includes a bottom lid die 10, a top lid die 15, and an active die 20 enclosed between the bottom and top lid dies. In other embodiments, there may be multiple active dies layered and bonded together and similarly enclosed between dies 10 and 15. In such a layered assembly, vertical interconnections may be provided by through-silicon vias (TSVs) or the like. A layered assembly may also include an interposer in which microfluidic channels have been etched to provide internal cooling.

The active die 20 will typically be a substrate for an integrated circuit so that one or more devices are formed directly on die 20. Discrete components may also be mounted on die 20 by wire bonding, flip chip bonding, or any of various other mounting technologies that are well known in the art.

For distribution of power and electrical input and output, a metallization pattern (not shown in the figure) including contact pads is provided on the upward-facing (in the figure view) surface and/or on the downward-facing surface of die 20.

Lid dies 10 and 15 can be made of any of various materials that meet standard packaging specifications, such as the specifications for CMOS or optical chip packaging, and that can be shaped appropriately by etching techniques. Examples of suitable materials for various applications include silicon, silicon dioxide, and borosilicate glass. The lid dies and the active die need not be made of the same material, although if different materials are used, due consideration should be given to the possible effects of a mismatch in thermal expansion coefficients.

In particular, the material of active die 20 may be chosen to provide a refractive index matched at least approximately to the index of a coupled external optical medium so as to minimize loss due to the optical index step between the respective media.

At least one device included on the active die has optical inputs and/or optical outputs, which are to be coupled to optical fibers for connection to hardware elements external to the package. For that purpose, slots 25 are etched in the periphery of the active die for insertion and alignment of lensed or cleaved ends of optical fibers 30. The slots are formed in the sidewall of the die, by which is meant a peripheral border area that is empty of active devices. As will be seen below, the sidewall may be built up by deposition of a filler material such as CVD oxide or spin-on glass that encapsulates the features formed on the active die. When the lid is assembled onto the active die, each slot becomes a circumferentially enclosed channel that is able to guide the insertion of the fiber.

In some embodiments, such as the embodiment of FIG. 1, at least one lid die is also etched to form slots. The slots in the lid die align with slots in the active die so that when the lid is assembled onto the active die, each aligned pair of slots becomes a circumferentially enclosed channel for guiding fiber insertion.

Although it may be especially advantageous to etch the slots with rectangular cross sections as shown in the figure, other shapes that may be useful for various applications include semi-cylinders, v-grooves, and any of various shapes having polygonal cross sections.

Figure 2:
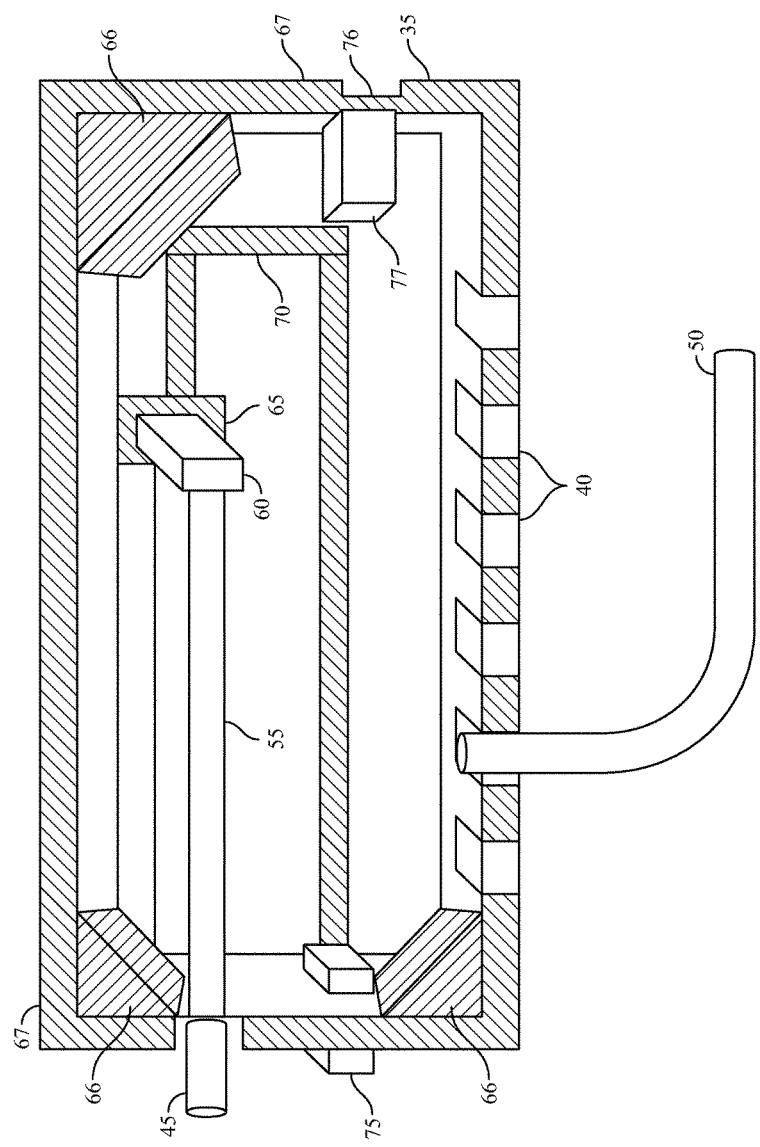
FIG. 2 illustrates a package similar to the package of FIG. 1, in a highly schematic, top-down perspective view with the lid die removed.

FIG. 2 illustrates an embodiment of the invention, similar to the embodiment of FIG. 1, in a highly schematic, top-down perspective view with the lid die removed. As seen in the figure, active die 35 is provided with slots 40 to guide the insertion of fibers 45, 50. Fiber 45 is inserted so as to butt against optical waveguide 55, which is, e.g., a ridge waveguide formed on the active die 35 by, e.g., etching or lithographic patterning of one or more deposited layers. Waveguide 55 provides a transmissive optical path between fiber 45 and optoelectronic device 60. Device 60 is shown mounted on electrical contact pad 65, which is electrically continuous with conductive trace 70 formed on the upward-facing surface of active die 35.

In the view of FIG. 2, the encapsulating fill material 66 has been cut away everywhere except in the sidewalls 67 so as to reveal buried features.

In other arrangements, inserted fibers can butt directly against optoelectronic devices instead of, or in addition to, butting against optical waveguides.

Also seen in the figure is electrical feedthrough 75 which passes through the sidewall of active die 35 and as shown, is electrically continuous with conductive trace 70. One example of an electrical feedthrough is a through-silicon via (TSV).

Optical feedthroughs may also be provided. An example of an optical feedthrough is a region 76 in the sidewall of active die 35 that has been made thinner to improve optical coupling between a waveguiding medium 77 internal to the die and a waveguiding medium (not shown) external to the die. This technique can be effective if the material of the die has sufficient transparency at the coupled wavelength or wavelengths. Another example of an optical feedthrough is a window of, e.g., deposited silica or of silica that is grown in situ. Optical feedthroughs can be formed in the active die or in the lid die. By cutting a slot only partway through a sidewall, an optical feedthrough can be combined with the slot. In such an arrangement, the inserted fiber abuts the feedthrough from the outside, and a waveguide can abut the feedthrough from the inside.

Optical feedthroughs as described above, which do not fully penetrate the sidewall of the active die or lid die, are especially advantageous when a hermetic seal is desired.

Figure 3:
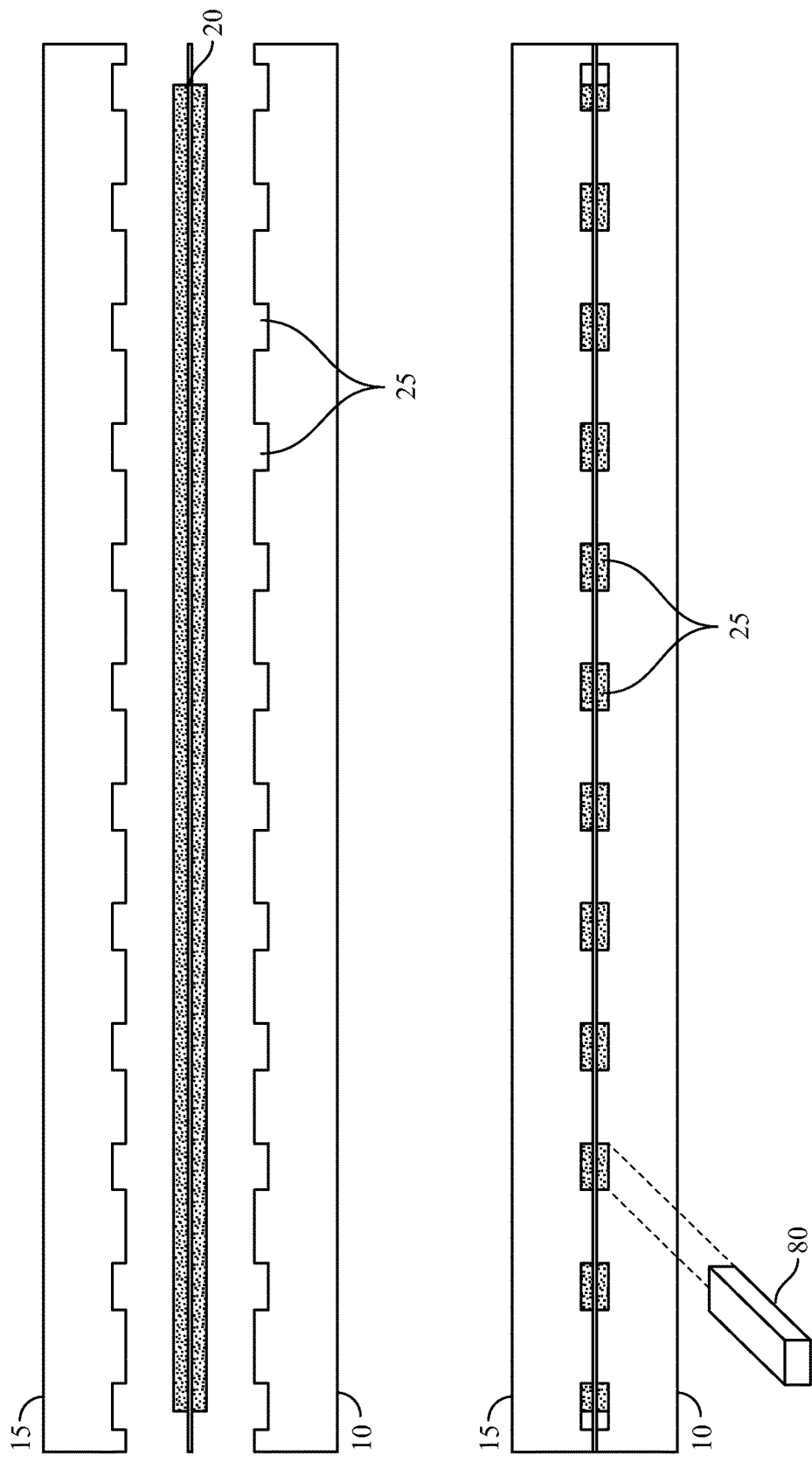
FIG. 3 provides a simplified view of a package similar to the package of FIG. 1, but for an embodiment that is adapted for intimate coupling between the packaged photonic circuitry and laser diodes. The upper view is a side-elevational, exploded view of the package before bonding. The lower view is a side-elevational view of the package after bonding.

FIG. 3 shows an embodiment that, like the embodiment of FIG. 1, includes an active die 20, a top lid die 15, a bottom lid die 10, and a series of slots 25. Unlike the embodiment of FIG. 1, however, the slots 25 are in this instance adapted for the insertion of laser diodes 80. Like the optical fibers of FIG. 1, the laser diodes are guided by the slots and are inserted to butt against a waveguide or directly against an optoelectronic device.

Multilayer optical networks have recently been proposed as a way to increase device density in photonic interconnection networks while mitigating the detrimental effects of insertion loss and crosstalk. For example, A. M. Jones et al., "Layer separation optimization in CMOS compatible multilayer optical networks," in *Optical Interconnects Conference* 2013, IEEE, 5-8 May 2013, pp. 62-63, describes a design study for a multilayer silicon nitride over silicon-on-insulator network. In such an arrangement, a silicon optical layer is overlain by a second optical layer formed, e.g., of silicon nitride.

A photonics chip designed according to these or similar principles can have two or even more layers of photonic interconnects. Hence laser light may be coupled into such a chip from several levels.

Turning again to FIG. 3, it will be seen that the slots 25 for insertion of laser diodes are disposed in two levels. If active die 20 is a multilayer photonics chip, the slots at each level may communicate with respective optical layers of the chip.

Multiple rows of slots may likewise be useful for optically connecting to respective levels of a composite die consisting of two or more active dies that are bonded together. As noted, TSVs or the like may be used to provide vertical interconnections in such assemblies.

Figure 4:
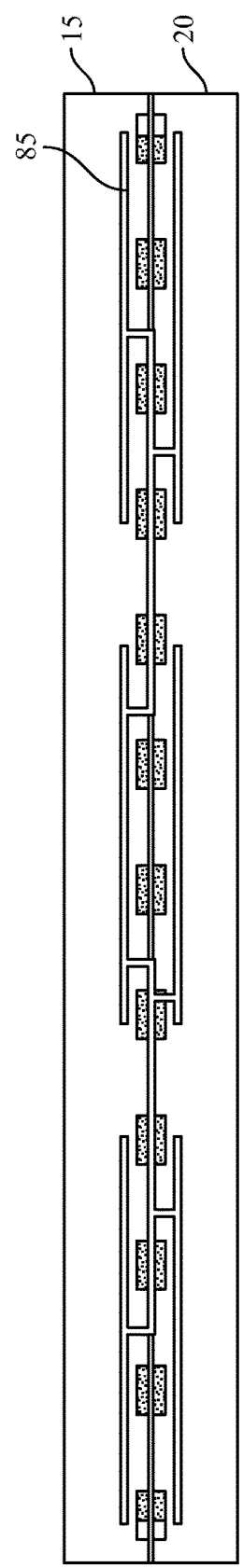
FIG. 4 provides a simplified, side-elevational view of an assembled package similar to the package of FIG. 3, but including adaptations for microfluidic transport of coolant for temperature stabilization.

FIG. 4 shows an embodiment similar to the embodiment of FIG. 3, but with a further adaptation for the circulation of fluid coolant. As seen in the figure, a network of microfluidic channels 85 is etched in the body of the active die 20. Similar channels may also be etched in one or both of the lid dies, as well as in an interposer die within a vertical stack as noted above. Peripheral slots similar to the slots for optical fibers or laser diodes can be provided for external input and return conduits for the coolant.

As noted above, it will often be advantageous to integrate a laser diode, such as a VCSEL, directly into the package, instead of first coupling the light into a fiber and then packaging the fiber. The reason is that the optical cavity of a typical diode laser is rectangular in cross section, and thus is readily mode matched to a rectangular waveguide if appropriately dimensioned. By matching the electric field in the optical mode between media both in size and in shape, it is possible to achieve low-loss optical coupling.

A first method for fabricating a device package according to any of the various embodiments disclosed here is a Wafer-Level Packaging (WLP) method. According to that method, a plurality of active dies are defined jointly on a common substrate wafer, and a plurality of lid dies are likewise defined jointly on a common substrate wafer. After the substrate wafers are fully processed, and after any externally provided circuitry has been mounted on the optical substrate wafer, the lid substrate wafer (or pair of lid substrate wafers in the event there are to be both top and bottom lid dies) is bonded to the active wafer. The bonded substrate wafers are then diced into a plurality of individual packages. The WLP method is advantageous because it can reduce cost and can reduce the likelihood and extent of contamination.

Figure 5:
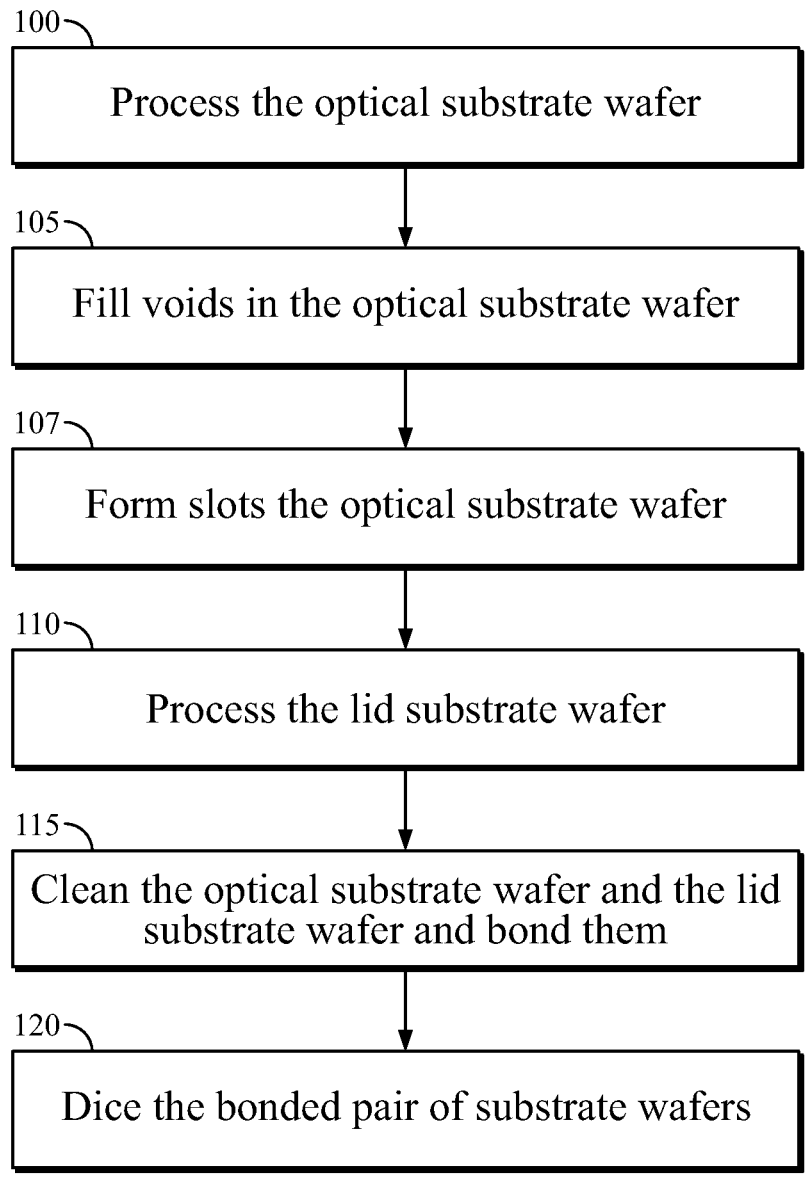
FIG. 5 is a flowchart illustrating a sequence of steps in the fabrication of a package according to an embodiment of the invention.

FIG. 5 illustrates a sequence of steps of an exemplary WLP process, useful in the present context, involving only one lid die per package. At step 100, the optical substrate wafer is processed. The processing includes the formation of waveguides by known deposition and etching processes. Alignment features such as cavities, posts, and grooves may also be formed to guide and receive the insertion of discrete devices. Fluidic microchannels may also be formed, as explained above. Electrical feedthroughs such as TSVs are typically also formed.

Voids in the optical substrate wafer are filled at step 105 by, e.g., PECVD deposition of silicon oxide, followed by planarization by, e.g., chemical-mechanical polishing (CMP). This step encapsulates the structures on the optical substrate wafer and builds up the sidewalls.

Figure 6:
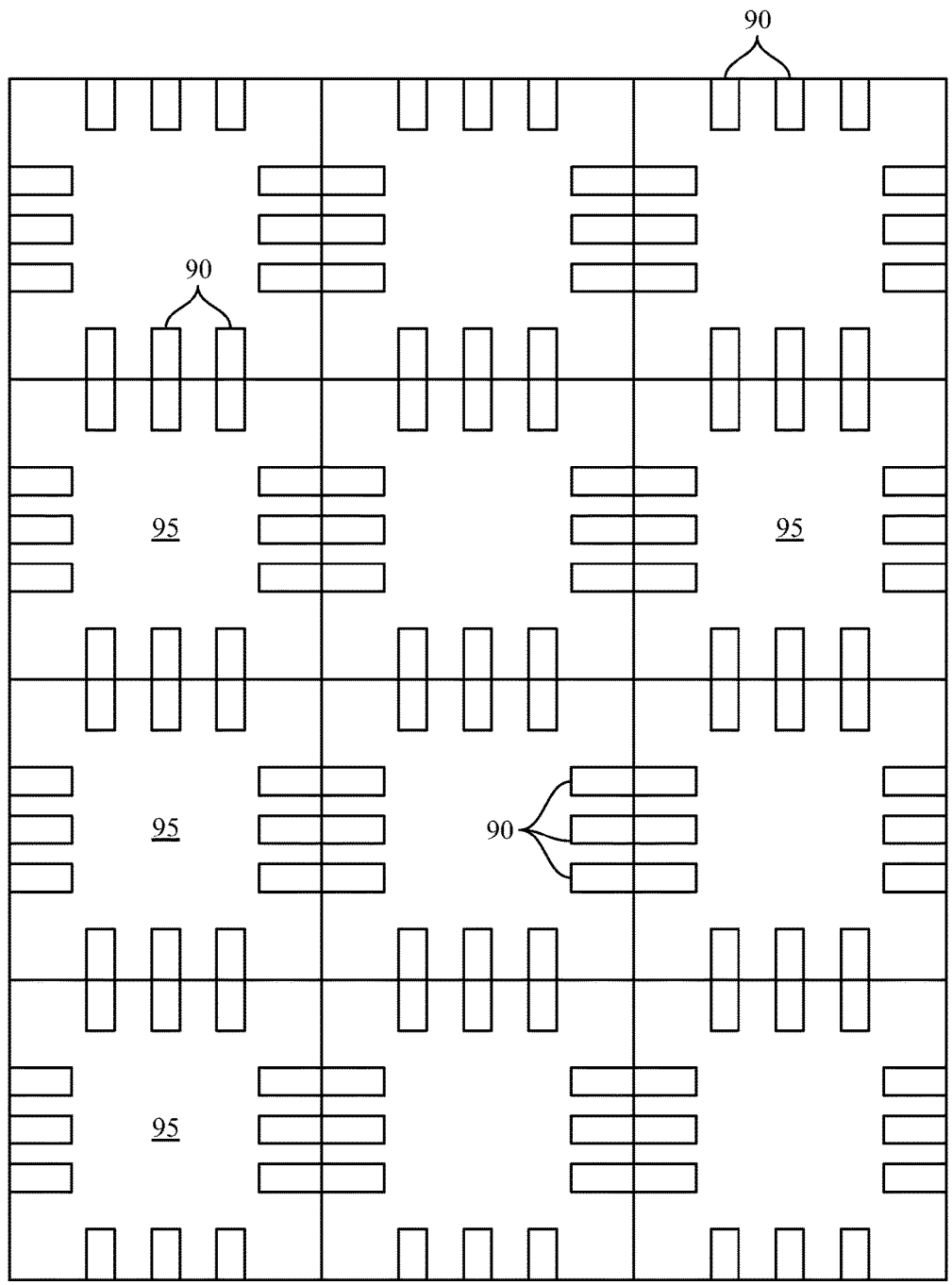
FIG. 6 is a schematic diagram illustrating the geometry of the as-formed alignment slots in an optical substrate wafer according to the fabrication sequence of FIG. 5.

The slots are formed in the optical substrate wafer at step 107. As shown schematically in FIG. 6, the slots 90 for external fiber (or laser diode) insertion are formed between pairs of adjacent dies 95, so that when the substrate wafer is diced, half of each as-etched slot will go with each die of the pair. The slots may be formed, e.g., by deep reactive-ion etch (DRIE) or by a potassium hydroxide (KOH) or other wet etch. The KOH etch would be useful, in particular, for forming the slot as a V-groove.

If the sidewalls of the optical substrate wafer have been built up in planarization step 105, then the slots will be formed, at least in part, by etching down through the fill material, which as noted may in some examples be CVD oxide or spin-on glass.

The width and depth of the slots relative to the dimensions of the (internal) optical waveguides will partially determine the alignment accuracy and precision between the external fibers and the internal waveguides, e.g. rib waveguides or ridge waveguides, that are formed as part of the active die. Hence, the lithographic method to be used in defining the slots should be chosen according to the tolerances that are required for the particular application.

The lid substrate wafer is processed at step 110. As noted, portions of the alignment slots may be etched in the lid wafer. In particular, therefore, the depth to which the slots are etched in the lid wafer may at least partially define the vertical alignment of the external fiber (or laser diode) to the internal waveguide. As also noted, fluidic microchannels may be formed. If required, voids in the lid substrate wafer are filled by deposition of silicon oxide, followed by planarization.

At step 115, the optical substrate wafer and the lid substrate wafer are cleaned, and then they are bonded together, e.g. by plasma bonding. The bonding step can be carried out such that the resulting individual packages are hermetically sealed.

At step 120, the bonded pair of substrate wafers is diced to yield a plurality of separate packages. The dicing step opens the fiber alignment slots so that they can be accessed from the side of each package for fiber or laser diode insertion.

For final assembly, optical fibers or laser diodes are inserted into their respective slots and secured by, e.g., ultraviolet-cured epoxy or etched MEMS latches. The use of active alignment with monitoring of transmitted optical power is advantageous for minimizing coupling losses.

Figure 7:
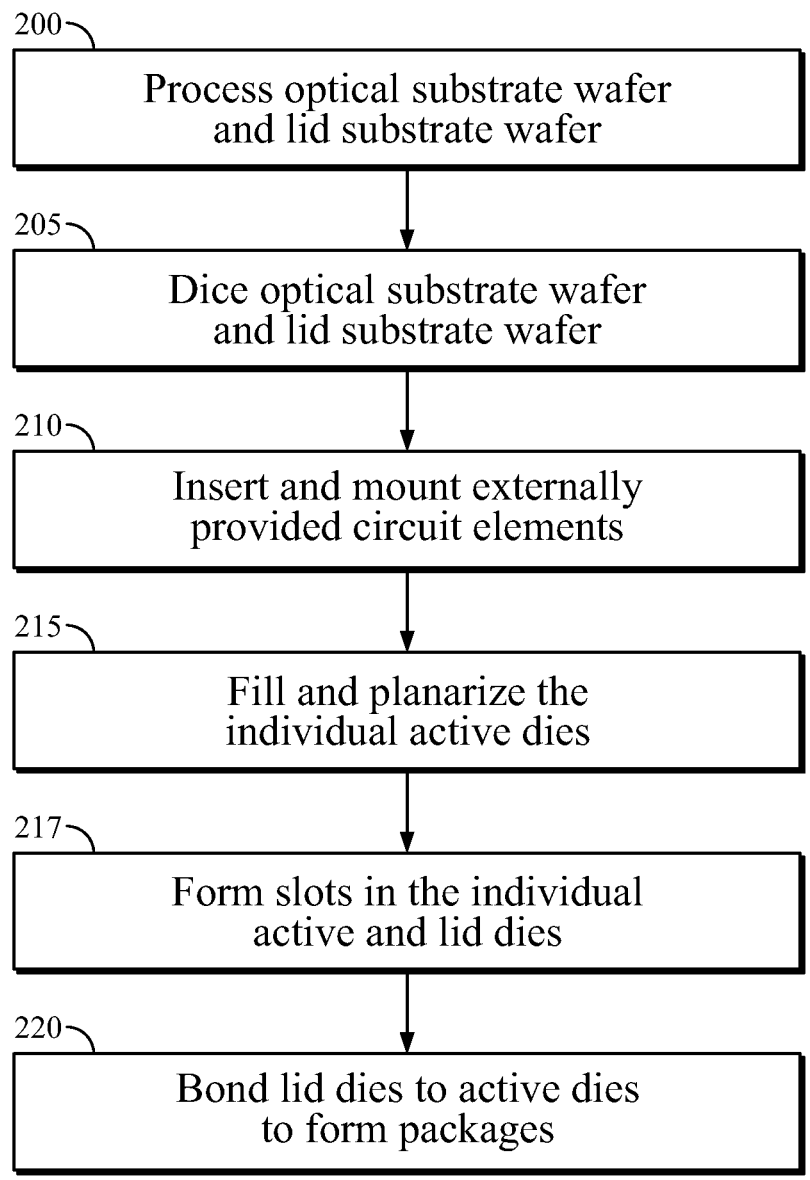
FIG. 7 is a flowchart illustrating a sequence of steps in the fabrication of a package according to an alternate embodiment of the invention.

An alternative fabrication method is a Chip-Level Packaging (CLP) method. FIG. 7 illustrates a sequence of steps of a CLP process that is useful in the present context.

At step 200, the optical substrate wafer and the lid substrate wafer are processed as described above, except for the insertion of externally provided circuit elements.

At step 205, the optical substrate wafer and the lid substrate wafer are diced to form individual active dies and lid dies.

At step 210, externally provided devices and other circuit elements are inserted and bonded on the individual active dies.

At step 215, the individual active dies are filled with silicon dioxide and planarized.

At step 217, slots are formed in the individual active dies and optionally in the individual lid dies.

At step 220, each pair consisting of an active die and a lid die is assembled and bonded together.

It will be appreciated that irrespective of the fabrication method, the active die or the lid die can be opened on the top and/or on the bottom for the installation of heat sinks, for attachment to ball-grid arrays, for chip-scale bonding, for flip-chip packaging, or for attachment of any chip, interconnect, mechanical support, fluidic channel, or the like.

Figure 8:
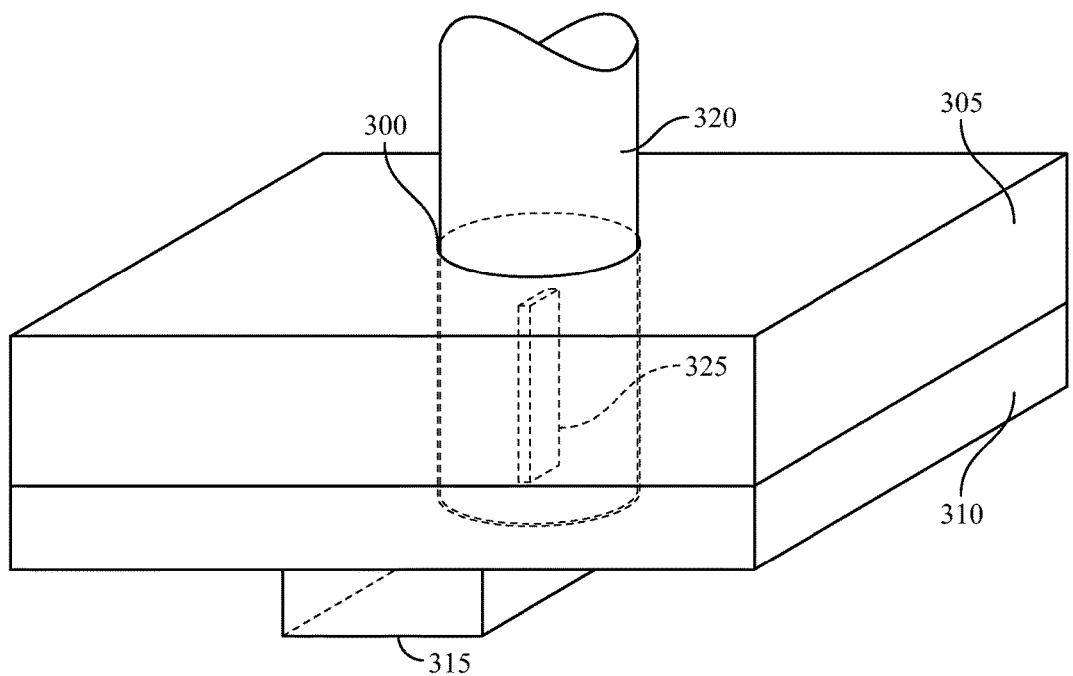
FIG. 8 provides a schematic cross-sectional side view of a method for coupling a waveguide or optical circuit within a package to an optical fiber or laser diode attached from outside the package. In the figure view, the active die, which in this example is a portion of an SOI wafer, is inverted so that the bottom of the handle layer is facing upward. As seen in the figure, the fiber or laser diode is inserted in a hole in the die that is etched, e.g. etched down to the buried oxide (BOX) layer of the wafer.

An alternate procedure for facilitating the coupling of an optical fiber to an SOI active die will now be described with reference to FIG. 8. Using backside die alignment techniques, deep reactive ion etching (DRIE) is used to cut, e.g., a 250-µm hole 300 from the back side of the die 305 to the buried oxide layer 310 where it underlies an optical waveguide 315 integral with the active die. To reduce loss, a known optical coupling element, such as a Bragg grating, can be etched into the waveguide where it approaches hole 300. The oxide layer 310 functions as a transmissive window between waveguide 315 and an inserted optical fiber 320 or laser diode 325. Oxide layer 310 can also serve as an etch stop layer for the silicon etch that forms the coupling element. After insertion of, e.g., fiber 320, epoxy is applied and cured to secure the fiber in place. If a laser diode 325 is to be inserted, hole 300 can be made rectangular to conform to the shape of the laser diode. Likewise, hole 300 can be appropriately dimensioned to conform to the shape of a VCSEL.

As noted, the sidewalls or the top or bottom walls of the package can be thinned to provide transmissive optical feedthroughs. Additionally, the top and or bottom surfaces can be thinned to enable localized optical evanescent coupling or capacitive or inductive electrical coupling. The local thinning is produced, e.g., by DRIE. Evanescent coupling may be advantageous, for example, where it is desired for an internal waveguide to couple with an external waveguide laid in a trench.

For capacitive coupling for the purpose, e.g., of electrical input-output, a thinned region on the active die or on the lid die can be backfilled with metal to create the coupling capacitor. For inductive coupling for the purpose, e.g., of power input, a thinned area can be metallized and patterned to form a coil or other inductive element.

In both capacitive and inductive coupling, the package material serves as a dielectric between an input side of the coupling element that is, e.g., mounted outside the device package and an output side that is mounted inside the device package. Internal electrical connectivity may be provided by, e.g., an electrical conductor pattern defined on the active die or on the lid die and having a branch that terminates on the output side of the coupling element.

Those skilled in the art will appreciate that the techniques described above allow for numerous variations without departing from the inventive scope. In one variation, for example, a bottom die is etched into a tub-like shape in which a central depressed region is surrounded by sidewalls. An active die is received into the depressed region. A lid die may similarly be conformed with a central depressed region to receive an upward-extending portion of the active die. The active die may be encapsulated in fill material that is likewise received within the depressed region or regions.

The bond between the bottom die and the lid die may be made between the native substrate materials of those dies, or it may involve fill material. Depending on whether fill material is used, and whether it extends to cover the sidewalls, slots may be etched into native substrate material of the bottom and/or lid dies, or into fill material.

Packages as described here are readily made stackable. Suitable interconnects for such purpose include TSVs, capacitive electrical interconnections, and vertical optical interconnections. As those skilled in the art will understand, gratings or similar diffractive elements can be used in combination with vertical optical interconnections for efficient coupling to horizontal waveguides. By stacking a plurality of individual dies, a package-in-package assembly can be made.

The invention claimed is:

1. An optoelectronic device package, comprising:
   a lid die; and
   an active die that is sealed or sealable to the lid die and in which one or more optical waveguides are integrally defined; wherein:
   one or more active device regions are included in the active die, an active device region being defined as an etched cavity into which an optoelectronic device can be placed or an optoelectronic device integrally formed in the active die;
   at least one said optical waveguide terminates at an active device region such that an optoelectronic device situated at the active device region can optically couple to the waveguide for routing an optical signal within the device package;

at least one slot, conformed to receive an inserted element, is defined in a peripheral part of the active die;

at least one said integral optical waveguide terminates at and is aligned with a said slot such that an optical fiber or optoelectronic device inserted in the slot can optically couple to the waveguide for routing an optical signal into and/or out of the device package; and at least one optoelectronic device is integrally formed in the active die.

2. The device package of claim 1, wherein one or more of the slots are conformed for inserting optical fibers.

3. The device package of claim 1, wherein one or more of the slots are conformed for inserting optoelectronic devices.

4. The device package of claim 1, wherein one or more of the slots have rectangular cross sections.

5. The device package of claim 1, wherein at least one of the slots in the active die aligns with a corresponding slot defined in the lid die.

6. The device package of claim 1, wherein:

at least one fiber-alignment groove is defined in the active die;

one end of the fiber-alignment groove terminates at an inner end of a said slot; and the other end of the fiber-alignment groove terminates at an active device region or at an end of an optical waveguide.

7. The device package of claim 1, wherein at least one said optical waveguide is optically coupled to a locally thinned portion of the active die such that optical transmission or optical evanescent coupling is enabled between the waveguide and an optical path external to the device package.

8. The device package of claim 1, wherein:

the lid die has a locally thinned portion; and a said integral waveguide is disposed such that when the device package is assembled, the waveguide abuts the locally thinned lid portion such that transmissive or evanescent optical coupling is enabled between the waveguide and an optical path external to the device package.

9. The device package of claim 1, wherein at least one said active device region is optically coupled to a locally thinned portion of the active die such that transmissive or evanescent optical coupling is enabled between an optoelectronic device occupying the active device region and an optical path external to the device package.

10. The device package of claim 1, further comprising an electrical conductor pattern defined on the active die and having a branch that terminates on a capacitive or inductive power coupler having two sides that are respectively interior and exterior to the device package, wherein:

a thinned but imperforate portion of the active die or the lid die intervenes between the input and output sides.

11. The device package of claim 1, wherein the lid die is hermetically sealed to the active die.

12. The device package of claim 1, wherein:

at least one electrical feedthrough penetrates the active die or the lid die; and an electrical conductor pattern defined on the active die includes a contact pad for making internal electrical contact to the feedthrough.

13. The device package of claim 1, wherein:

the device package comprises a top lid die and a bottom lid die; and the active die that is sealed or sealable to both the top lid die and the bottom lid die.

14. The device package of claim 1, further comprising a photonic chip having two or more layers of photonic interconnect, wherein photonic interconnects from the several layers are optically coupled to external optical elements inserted in respective ones of the slots.

15. The device package of claim 1, wherein:

at least one channel for microfluidic coolant transport is defined in the active die and/or in the lid die; and at least one said channel terminates at one of the slots such that a conduit inserted in the slot can deliver coolant into or out of the channel.

* * * * *